United States Patent [19]

Baines

[11] Patent Number: 4,705,972

[45] Date of Patent: Nov. 10, 1987

[54] SOLDERLESS ELECTRICAL CONNECTION IN A MOTOR

[75] Inventor: Roger F. Baines, Repulse Bay, Hong Kong

[73] Assignee: Johnson Electric Industrial Manufactory Limited, Chaiwan, Hong Kong

[21] Appl. No.: 824,549

[22] Filed: Jan. 23, 1986

[30] Foreign Application Priority Data

Oct. 24, 1985 [GB] United Kingdom ................. 8526254

[51] Int. Cl.[4] ............................................ H02K 11/00

[52] U.S. Cl. ........................................ 310/71; 310/42; 310/89; 310/154; 310/242; 310/248

[58] Field of Search ..................... 174/168; 339/95 D; 310/154, 239, 233, 89, 71, 43, 91, 42, 241, 242, 244, 245-248

[56] References Cited

U.S. PATENT DOCUMENTS

| | | | |
|---|---|---|---|
| 1,939,032 | 12/1933 | Aufiero | 310/239 |
| 1,950,616 | 3/1934 | Kyle | 174/168 |
| 2,256,870 | 9/1941 | Schaffer | 310/89 UX |
| 3,308,319 | 3/1967 | Faulhaber | 310/154 |
| 3,401,281 | 9/1968 | Martin | 310/43 |
| 3,445,693 | 5/1969 | Crawshaw | 310/154 |
| 4,046,445 | 9/1977 | Anhalt | 339/95 D |
| 4,056,299 | 11/1977 | Paige | 339/95 D |
| 4,237,394 | 12/1980 | Aoki | 310/154 |
| 4,513,214 | 4/1985 | Dieringer | 310/239 |
| 4,574,215 | 3/1986 | Mabuchi | 310/239 |

FOREIGN PATENT DOCUMENTS

| | | | |
|---|---|---|---|
| 1251400 | 10/1967 | Fed. Rep. of Germany | 339/95 D |
| 1528993 | 3/1976 | United Kingdom . | |
| 2050711 | 5/1979 | United Kingdom . | |
| 2091048 | 11/1981 | United Kingdom . | |

*Primary Examiner*—R. Skudy

*Attorney, Agent, or Firm*—Fleit, Jacobson, Cohn & Price

[57] ABSTRACT

A solderless electrical connection between a wire and an electrical contact forming part of a permanent magnet motor. The motor includes a generally U-shaped motor frame that defines an open volume within which is mounted a plastic spacer or insert and a pair of opposed permanent magnets and that surround a rotating armature. One end of the armature terminates in a shaft which is received within a bushing that is mounted at the center of the planar central portion. The other end of the armature terminates in a shaft. Next to the armature and mounted on the shaft is a commutator. The shaft passes through a metallic bushing that is defined as part of a non-conductive insert which mates with the motor frame. Also mounted on the non-conductive member are a pair of brush assemblies. Each brush assembly basically consists of a pair of planar, opposed parallel legs that are joined together by a planar portion. Near the center of the planar portion is a circular opening that is made up of a number of symmetrically arranged, resilient fingers. One of the legs contains an extension in the form of a brush leaf within which is mounted a carbon brush that interacts with the commutator. In use, a wire having a greater diameter than the diameter defined between the fingers is pushed into the opening causing the fingers to yield allowing the wire to penetrate. Because of their resiliency, the fingers prevent withdrawal of the wire after it has been inserted into the opening. In this way a solderless connection is formed between the brush assembly and a wire that is connected to a source of voltage for operating the motor.

8 Claims, 8 Drawing Figures

SOLDERLESS ELECTRICAL CONNECTION IN A MOTOR

FIELD OF THE INVENTION

The present invention relates to a solderless electrical connection for use in a motor in order to provide an economical and convenient way of connecting a lead wire to a motor contact.

BACKGROUND OF THE INVENTION

In prior art motors, and especially permanent magnet motors, a brush gear is supplied that terminates at one end in a brush assembly and at its other end in an electrical contact. Typically, the electrical contact is in the form of a planar surface and is made from a material such as copper or copper alloy which readily receives a conventional flux solder in order to electrically connect a wire to the motor contact. Although this method of securing a wire to an electrical contact has proved successful, it is nevertheless time consuming and adds extra cost to the manufacturing process for producing small motors.

There is thus a need for a solderless connection which allows a wire to be secured to the electrical contact of a motor without the time consuming operation of soldering. The present invention is directed toward filling that need.

SUMMARY OF THE INVENTION

The present invention relates to a solderless electrical connection between a wire and an electrical contact forming part of a permanent magnet motor.

The motor includes a generally U-shaped motor frame which is made up of two planar legs that are generally parallel and spaced from each other. The two legs are joined at one end by a generally planar central portion. The spaced legs and the central portion define an open volume within which is mounted a plastic spacer or insert and a pair of opposed permanent magnets that surround a rotating armature. One end of the armature terminates in a shaft which is received within a bushing that is mounted at the center of the planar central portion. The other end of the armature terminates in a shaft. Next to the armature and mounted on the shaft is a commutator. The shaft passes through a metallic bushing that is defined as part of a non-conductive insert which mates with the distal ends of the legs and of the motor frame. Also mounted on the non-conductive member are a pair of brush assemblies. The two brush assemblies are identical. Each brush assembly basically consists of a pair of planar, opposed parallel legs that are joined together by a planar portion. Near the center of the planar portion is a circular opening that is made up of a number of symmetrically arranged, resilient fingers. In a preferred embodiment, the aperture is square shaped with a finger emanating from each of the four corners along one of the diagonals of the square shaped aperture. One of the legs contains an extension in the form of a brush leaf within which is mounted a carbon brush.

In use, a wire having a greater diameter than the diameter defined between the fingers is pushed into the opening causing the fingers to yield, allowing the wire to penetrate. Because of their resiliency, the fingers prevent withdrawal of the wire after it has been inserted into the opening. In this way a solderless connection is formed between the brush assembly and a wire that is connected to a source of voltage for operating the motor.

DETAILED DESCRIPTION OF THE PREFERRED EMBODIMENT

Figure 1:
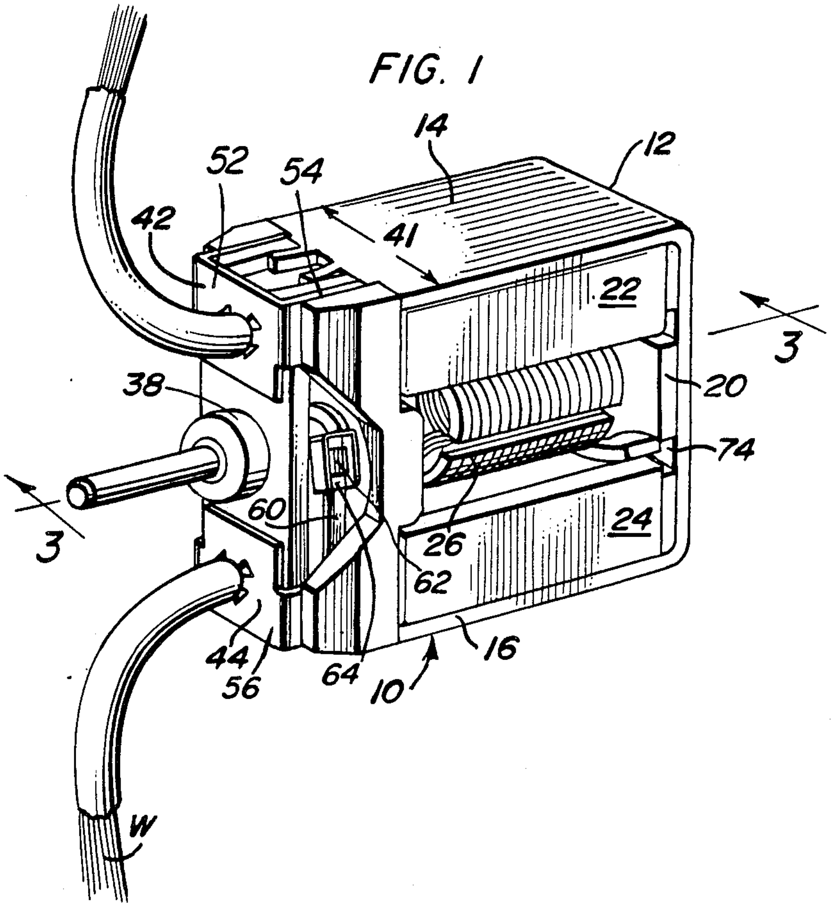
FIG. 1 is a perspective view of a small permanent magnet motor embodying the teachings of the subject invention.

In describing a preferred embodiment of the invention illustrated in the drawings, specific terminology will be resorted to for the sake of clarity. However, the invention is not intended to be limited to the specific terms so selected, and it is to be understood that each specific term includes all technical eguivalents which operate in a similar manner to accomplish a similar purpose.

Figure 2:
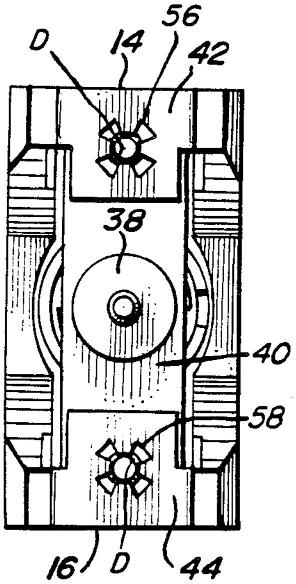
FIG. 2 is a front plan view of the motor of FIG. 1 with the wires removed.
Figure 3:
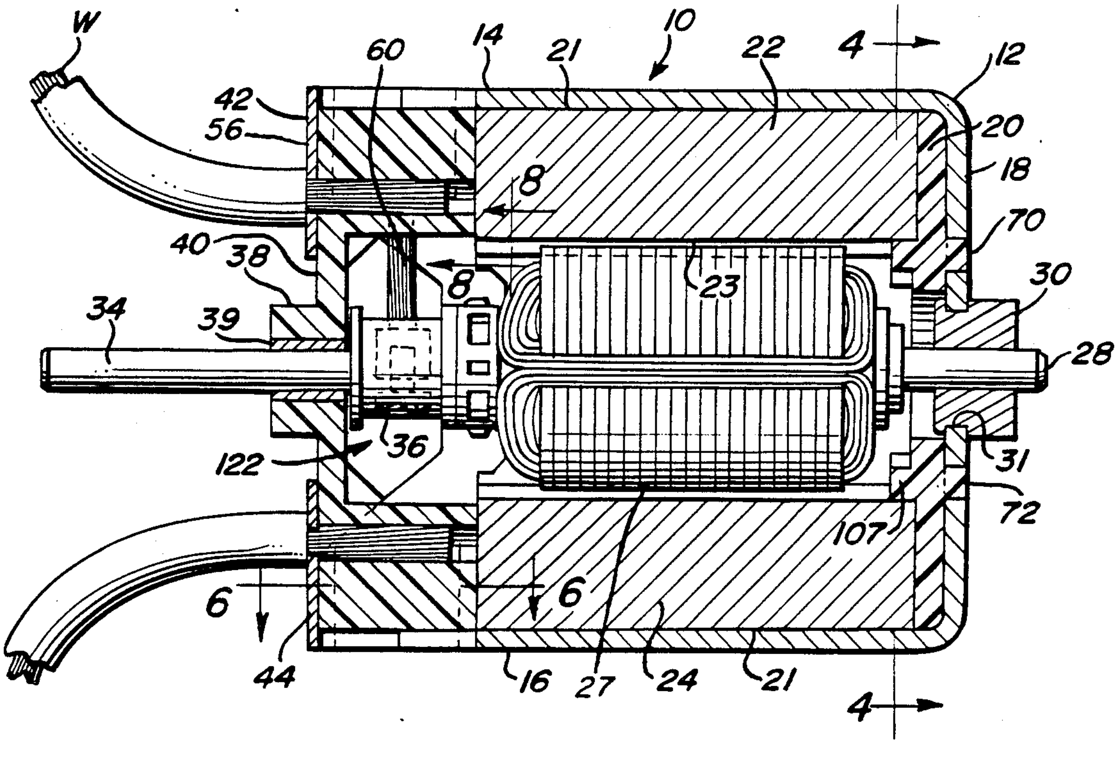
FIG. 3 is a view of the motor of FIG. 1 taken along lines 3—3.

With reference to FIGS. 1-3, the construction of a permanent magnet motor embodying the teachings of the subject invention is presented and generally designated as 10. The motor includes a generally U-shaped motor frame 12 made from steel. The motor frame is basically two planar legs 14 and 16 that are generally parallel and spaced from each other. The two legs are joined at one end by a generally planar central portion 18. The spaced legs and the central portion define an open volume within which is mounted a plastic spacer or insert 20 and a pair of opposed permanent magnets 22 and 24 that surround a rotating armature 26. One end of the armature terminates in a shaft 28 which is received within a bushing 30 that is mounted at the center of the planar central portion 18. The other end of the armature terminates in a shaft 34. Next to the armature and mounted on the shaft 34 is a commutator 36. Shaft 34 passes through a bushing 38 that is defined as part of a non-conductive insert or block-shaped non-conductive body 40 which mates with the distal ends of the legs 14 and 16 of the motor frame 12. Also mounted on the non-conductive member 40 are a pair of integral U-shaped electrical conductive bodies or brush assemblies 42 and 44. The brush assemblies are identical and therefore only one will be described in detail with the realization that the same description applies to the other brush assembly. Taking brush assembly 42 as exemplary, the assembly basically consists of a pair of planar, opposed parallel legs 52 and 54. The legs are joined together by a planar or central portion 56. Near the center of the planar portion 56 is a circular opening 58 that is made up of a number of symmetrically arranged, resilient fingers 60. One of the legs 52 contains an extension in the form of a brush leaf 62 within which is mounted a carbon brush 64.

In use, a wire W having a greater diameter D than the diameter defined between the fingers 60 is pushed into the opening 58 causing the fingers 60 to yield, allowing the wire to penetrate as shown in FIG. 3. Because of their resiliency, the fingers prevent withdrawal of the wire W after it has been inserted into the opening 58. In this way a solderless connection is formed between the brush assembly and a wire W that is connected to a source of voltage for operating the motor.

With reference to FIGS. 1–7, a more detailed description of the elements constituting the solderless connection and the motor design are presented.

FIGS. 1–3 show the details of a permanent magnet motor embodying the teachings of the subject invention. The motor 10 contains a motor frame 12 consisting of a pair of flat, generally parallel and spaced legs 14 and 16 joined at one end by a generally planar portion 18. The metallic motor frame 12 essentially defines the overall size of the motor. The thin metallic motor frame matches with the radial thickness of the permanent magnets 22 and 24 to establish the optimum energy level in the air gap 27 between each magnet and the armature. The geometry of the motor frame allows the magnets 22 and 24 to be as wide as the width 41 of the frame thereby increasing the total area of magnetic flux and also eliminating the short circuiting of flux through the sidewalls commonly found in the prior art motors.

Figure 4:
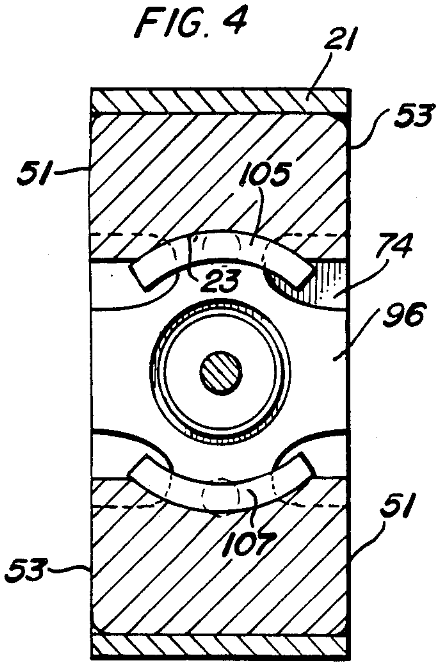
FIG. 4 is a view taken along lines 4—4 of FIG. 3.
Figure 5:
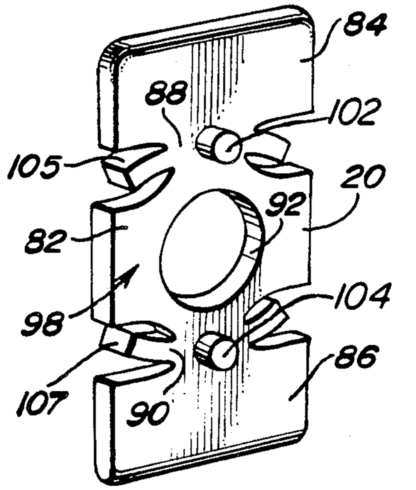
FIG. 5 is a perspective view of the plastic insert used in the motor of FIG. 1.

At the center of the planar portion 18 of the motor frame 12, an aperture 31 is provided within which is mounted bushing 30. Within the central portion, on either side of the bushing, are defined position holes 70 and 72. The planar central portion 18 contains an interior surface 74 that receives non-conductive insert 20 generally made of a non-conductive material such as plastic. With reference to FIGS. 4 and 5, the insert 20 has the overall shape of a thin rectangular solid and is defined by a central portion 82 and two side portions 84 and 86. The central portion is joined to each of the side portions through the intermediary of a connecting web 88 and 90. At the center of the central portion is an aperture 92 which encircles the periphery of the bearing or bushing 30 when the insert is mounted next to the interior surface 74. The insert 20 contains two planar surfaces 96 and 98. Defined on surface 98 are a pair of projecting cylindrical bosses 102 and 104. These cylindrical bosses are spaced relative to the aperture 92 so that the cylindrical bosses mate with the apertures 70 and 72 defineds on the motor frame 12. The other surface 96 of insert or non-conductive body 20 contains upwardly projecting guide rails 105 and 107. As will be explained hereinafter, these guide rails are shaped and spaced to facilitate placement and alignment of the magnets 22 and 24 within the motor frame 12.

Figure 6:
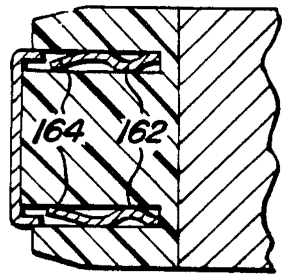
FIG. 6 is a view taken along lines 6—6 of FIG. 4.
Figure 7:
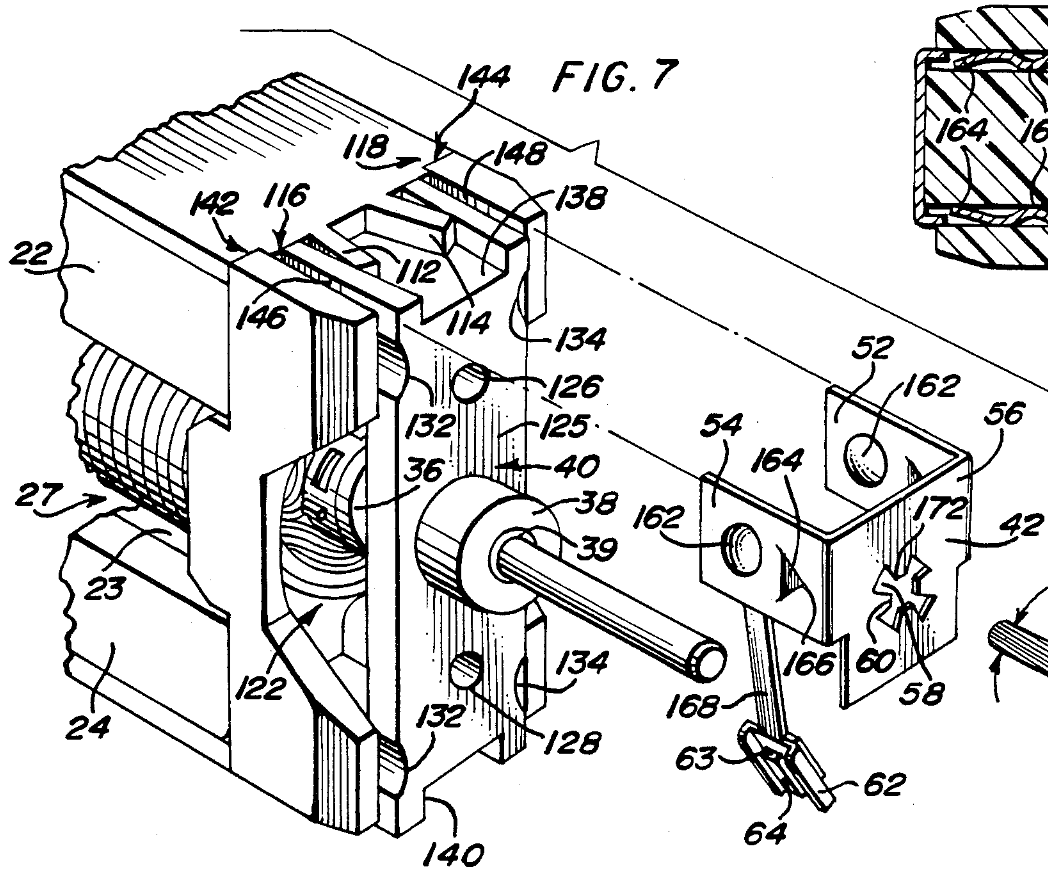
FIG. 7 is an exploded perspective view of the front portion of the motor of FIG. 1.

Each of the legs 14 and 16 of motor frame 12 terminate at their distal ends in a pair of projections 112 and 114 along with stepped cut-outs 116 and 118. These structural features mate with corresponding elements defined in non-conductive insert 40 which is made of a suitable insulating material such as plastic. With reference to FIGS. 1, 6 and 7, insert 40 generally comprises a plastic block that has an interior cut-out 122 which is shaped to be larger than the commutator 36 that resides within the opening. The outermost portion of the insert 40 defines a generally planar rectangular member 124. At the central portion of the member is defined a plastic bushing 38 that holds a metallic tubular bushing 39. At the two ends of the rectangular member are defined a pair of tubular apertures 126 and 128, which extend through the block or insert 40 generally perpendicular to the planar surface 125 of the rectangular portion 124. Positioned on either side of each aperture 126 and 128 are a pair of indented grooves 132 and 134. These grooves each have a longitudinal axis that is generally perpendicular to the longitudinal axis of the apertures 126 and 128. The grooves 132 and 134 also define groove surfaces which are generally parallel to and spaced from each other. At each of the extreme ends of the rectangular member 124 is defined troughs 138 and 140. These troughs extend throughout the full width of the body 40 and define an open area for receiving legs or projections 112 and 114. Positioned about either side of the troughs 138 and 140 are stepped inserts 142 and 144 which mate with the corresponding steps 116 and 118 of the motor frame 12. Also defined at each end of the rectangular member 124 are a pair of slits 146 and 148. These slits receive the legs of one of the electrical contacts or brush assemblies 42 and 44 in the manner to be described hereinafter.

The motor frame 12 and the two plastic inserts 20 and 40 define an area within which is mounted the pair of opposed permanent magnets 22 and 24 and the rotating armature 26. Each of the magnets is a generally rectangular solid with the major flat surface 21 of the rectangular solid placed in mating relationship with the interior surface of one of the legs 14 and 16 of the motor frame 12. The opposite surface 23 of each of the magnets is curved to conform with the curved surface of the armature 26. The radius of the curved surface 23 defined in the magnet is greater than the radius of the armature 26 in order to create an air gap 27 between the magnet and the armature. The side surfaces 51 and 53 (FIG. 4) of each magnet are exposed and not covered by the sidewall supports found in prior art motors, thus eliminating the problem of short circuiting of flux through the sidewalls.

Figure 8:
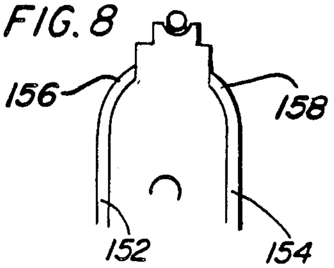
FIG. 8 is a view taken along lines 8—8 of FIG. 3.

The interior surface of insert 40 contains two edge projections 152 and 154 that contain edges 156 and 158 (FIG. 8) which together define boundaries for positioning the permanent magnets in the manner to be described hereinafter.

With reference to FIGS. 1, 3 and 7, each of the magnets 22 and 24 are mounted within the motor frame so that the major surface area of each magnet is pressed up against the interior surface of one of the legs 14 and 16. The extreme ends of each magnet are received respectively within evacuated portions in each of the inserts 20 and 40 in order to stabilize the magnet. Interposed between the magnets is the armature 26 which has one end 28 in bushing 30 and the othor end passing through metallic bushing 39. The commutator 36 of the motor is positioned within the evacuated portion or hollow volume 122 of insert 40. Also positioned within this insert in the manner to be described hereinafter is the brush assemblies or brush gear 42 and 44.

With reference to its orientation as shown in FIG. 7, brush gear 42 generally comprises a pair of horizontally extending legs or parallel projections 52 and 54 which are joined at their upper ends by transverse planar member 56. The planar legs are elongated and generally have a width that is less than the thickness of the planar surface. Each of the legs contains a mounting means or an inwardly projecting dimple 162 that rides in one of the grooves 132 and 134 when the brush gear is mounted on the insert 40. Each of the legs also contains an inwardly projecting triangular cut-out 164. Because the cut-out terminates in a sharp point 166, once the brush gear is mounted on the insert, it is difficult to remove it because of the resistance provided by the point engaging the surface of either of the grooves 132 and 134.

Near the center of one of the legs 54, an elongated finger 168 emanates from one side of the leg. The finger terminates in a brush leaf 62 that contains an aperture 63 for receiving a motor brush 64.

The planar surface 56 of the brush gear or brush assembly contains aperture 58 near its central portion. The aperture is generally square with fingers 60 emanating inwardly toward each other from each of the corners of the square. The fingers occupy the same plane as the planar surface 56 and are directed inwardly towards the center of the square. The ends of the fingers define an opening 172 that is approximately 80% of the diameter of a wire W which is to be inserted within the opening. In a preferred embodiment, the brush gear or brush assembly structure is approximately 0.11 to 0.12 millimeter thick with a preferred range of 0.08–0.15 millimeters. Likewise, in a preferred embodiment the brush gear is made of beryllium cooper.

Brush gear or brush assembly 44 is of precisely the same construction as brush gear or brush assembly 42. Each brush gear or brush assembly is positioned on the outer surface of insert 40 so that legs 52 and 54 are received within slits 146 and 148. Likewise, the dimples 162 and the triangular cut-outs 164 are caused to ride within grooves 132 and 134 as the contact is brought into its final resting place against the surface 125 of insert 40. The holes 126 and 128 in insert 40 are arranged to coincide with the opening 58 so that when a wire W is inserted into the opening or aperture 58 the end of the wire is permitted to occupy up to the full length of the hole 128. Once a wire W has been inserted, the fingers 60 are caused to bend inwardly as shown in FIG. 3. This inward bending prevents removal of the wire W under normal conditions of use. This construction thus provides the solderless connection.

When brush gear 42 or brush assembly 42 is mounted on insert 40, the brush leaf 62 and extension or finger, or elongated resilient extension member 168 are positioned within space 122 as defined by insert 40. The carbon brush 64 of brush leaf 62 is operatively associated with commutator 36. The size of the space 122 is made as large as possible in order to maximize the length of brush 64.

Although the present invention has been shown and described in terms of a preferred embodiment, it will be appreciated by those skilled in the art that changes or modifications are possible which do not depart from the inventive concepts described and taught herein. Such changes and modifications are deemed to fall within the purview of these inventive concepts.

What is claimed is:

1. A device for making a solderless electrical connection between a wire and an electrical motor comprising:

an integral U-shaped electrical conductive body including
- a pair of opposed parallel legs and a central portion joining said parallel legs;
- mounting means extending from said parallel legs for mounting said body to a motor;
- an elongated resilient extension member integrally protruding from one of said legs and terminating at its other end spaced from said one leg, said other end being free;
- a brush leaf forming the free end of said elongated resilient extension member;
- said central portion having an aperture with a greater cross-sectional area than the cross-sectional area of a wire to be connected; and
- a plurality of symmetrically arranged resilient fingers extending into the plane of said aperture, the distal ends of said fingers defining the boundary of a wire-receiving opening in the general shape of a circle, the cross-section of said circle being less than the cross-sectional diameter of the wire to be connected so that when the wire penetrates said wire-receiving opening, said fingers distort in the direction of wire penetration, and the distortion of said fingers preventing withdrawal of said wire from within said wire-receiving opening.

2. The device of claim 1, wherein said aperture is square shaped.

3. The device of claim 2, wherein four fingers are provided with each finger protruding from one of the corners of said square shaped aperture along one of the diagonals of said square shaped aperture.

4. The device of claim 1, wherein said electrical contact is made from a copper alloy.

5. An electrical motor including a device for creating a solderless connection between a wire and the motor comprising:

- a U-shaped motor frame including a pair of parallel legs and a central portion joining said parallel legs;
- an armature shaft having two ends, one end rotatably supported by said central portion;
- an armature mounted on said armature shaft;
- a commutator mounted on said armature shaft adjacent and electrical connected to said armature on the side thereof remote from the central portion;
- a pair of permanent magnets magnetically mounted to said parallel legs separated from the armature by air gaps;
- a block-shaped non-conductive body mounted to said motor frame, said body defining a hollow volume surrounding said commutator;
  - an integral U-shaped electrical conductive body having a pair of opposed parallel projections and a central part joining said parallel projections, said central part having an aperture;
  - an elongated resilient extension member integrally attached at one end to one of said projections, and terminating at its other end spaced from said one projection, said other end being free;
- a brush leaf forming the free end of said elongated resilient extension member;
- a carbon brush secured to said brush leaf;
- said or block-shaped non-conductive body having a plurality of slits for receiving and mounting said opposed parallel projections in said non-conductive body with said elongated resilient extension member and said brush leaf positioned in the hollow volume to place said brush in operative relationship with said commutator; and
- the other end of the armature shaft being rotatably supported by said non-conductive body.

6. The motor of claim 5, further includes:

- a second non-conductive body having an aperture coaxially with said armature shaft;
- first means for fixing said second non-conductive body relative to said motor frame; and
- second means for fixing said pair of permanent magnets relative to said armature with said air gap defined therebetween.

7. The motor of claim 5, wherein said block-shaped non-conductive body includes:

a planar face, defining the front of said non-conductive body, having a pair of through apertures extending from the planar face to the back of said non-conductive body;

a pair of integral U-shaped electrical conductive bodies mounted on said block shaped non-conductive body with the apertures defined by the central parts of said integral U-shaped electrical conductive bodies aligned with the pair of through apertures defined by said block-shaped non-conductive body.

8. The motor of claim 7, wherein said block-shaped non-conductive body further includes:

a pair of troughs extending the full width of said non-conductive body defined in opposing end faces perpendicular to said front face of said non-conductive body, pairs of projections ending from the parallel legs of said frame, each pair of projections engaging the walls of a trough to fix said block-shaped non-conductive body onto said motor frame.

* * * * *